United States Patent
Arrufat et al.

(10) Patent No.: US 10,750,206 B2
(45) Date of Patent: Aug. 18, 2020

(54) METHOD FOR ENCODING AND DECODING IMAGES, DEVICE FOR ENCODING AND DECODING IMAGES, AND CORRESPONDING COMPUTER PROGRAMS

(71) Applicant: Orange, Paris (FR)

(72) Inventors: Adria Arrufat, Rennes (FR); Pierrick Philippe, Melesse (FR)

(73) Assignee: ORANGE, Paris (FR)

( * ) Notice: Subject to any disclaimer, the term of this patent is extended or adjusted under 35 U.S.C. 154(b) by 93 days.

(21) Appl. No.: 15/780,032

(22) PCT Filed: Nov. 29, 2016

(86) PCT No.: PCT/FR2016/053136
§ 371 (c)(1),
(2) Date: May 30, 2018

(87) PCT Pub. No.: WO2017/093653
PCT Pub. Date: Jun. 8, 2017

(65) Prior Publication Data
US 2018/0359492 A1    Dec. 13, 2018

(30) Foreign Application Priority Data
Nov. 30, 2015  (FR) ..................... 15 61573

(51) Int. Cl.
G06K 9/00       (2006.01)
H04N 19/85      (2014.01)
H04N 19/60      (2014.01)
H04N 19/117     (2014.01)
H04N 19/625     (2014.01)

(52) U.S. Cl.
CPC .......... *H04N 19/85* (2014.11); *H04N 19/117* (2014.11); *H04N 19/60* (2014.11); *H04N 19/625* (2014.11)

(58) Field of Classification Search
CPC .... H04N 19/85; H04N 19/117; H04N 19/625; H04N 19/60
See application file for complete search history.

(56) References Cited

U.S. PATENT DOCUMENTS

| 6,281,942 B1 | 8/2001 | Wang |
| 7,487,193 B2 | 2/2009 | Srinivasan et al. |
| 2006/0028541 A1* | 2/2006 | Haraguchi ............... H04N 5/21 348/27 |

(Continued)

OTHER PUBLICATIONS

International Search Report dated Feb. 15, 2017 for corresponding International Application No. PCT/FR2016/053136, filed Nov. 29, 2016.

(Continued)

*Primary Examiner* — Aaron W Carter
(74) *Attorney, Agent, or Firm* — David D. Brush; Westman, Champlin & Koehler, P.A.

(57) ABSTRACT

A method for encoding at least one image split into blocks. The method includes, for a current block to be encoded from the image, at least one modification of two data points in the block via an operation of linear combinations operating on the two data points, at the end of which a modified block is obtained, application of a separable transform operation to the data points in the modified block, and encoding the data points obtained after application of the separable transform operation.

10 Claims, 5 Drawing Sheets

(56) References Cited

U.S. PATENT DOCUMENTS

| | | | |
|---|---|---|---|
| 2012/0140821 A1* | 6/2012 | Drugeon | H04N 19/105 |
| | | | 375/240.12 |
| 2012/0170858 A1* | 7/2012 | Andersson | H04N 19/176 |
| | | | 382/238 |
| 2014/0212046 A1* | 7/2014 | Wong | G06K 9/38 |
| | | | 382/194 |
| 2015/0062368 A1* | 3/2015 | Li | G06T 5/50 |
| | | | 348/222.1 |
| 2016/0269725 A1* | 9/2016 | Mrak | H04N 19/132 |
| 2016/0269738 A1* | 9/2016 | Henry | H04N 19/51 |
| 2016/0309158 A1* | 10/2016 | Philippe | H04N 19/147 |
| 2017/0230688 A1* | 8/2017 | Philippe | H04N 19/597 |
| 2018/0020216 A1* | 1/2018 | Philippe | H04N 19/122 |
| 2018/0098086 A1* | 4/2018 | Chuang | H04N 19/61 |
| 2018/0199031 A1* | 7/2018 | Lin | H04N 19/176 |
| 2018/0359492 A1* | 12/2018 | Arrufat | H04N 19/60 |
| 2019/0028738 A1* | 1/2019 | Philippe | H04N 19/176 |
| 2019/0158878 A1* | 5/2019 | Philippe | H04N 19/176 |

OTHER PUBLICATIONS

Written Opinion of the International Searching Authority dated Feb. 15, 2017 for corresponding International Application No. PCT/FR2016/053136, filed Nov. 29, 2016.

Anonymous. "Rotation matrix", Wikipedia. Nov. 10, 2015.

Murching A. M. et al., "Linear Pre-Post Filters for DCT-Based Image Coding Systems", Journal of Electronic Imaging, SPIE/IS & T, 1000 20th St. Bellingham WA 98225-6705, USA, vol. 7, No. 3, Jul. 1, 1998 (Jul. 1, 1998), pp. 605-615, XP000771767.

Suthaharan S. et al., "A New Linear Post-Filtering Technique to Reduce Transform Coding Block-Edge Atrifact at Low Bit Rates", Australian Journal of Intelligent Information Processing Systems, Centre of Intelligent Information Processing Systems, Nedlands, AU, vol. 5, No. 2, Jan. 1, 1998 (Jan. 1, 1998), pp. 120-128, XP001006047.

List P. et al., "Adaptive Deblocking Filter", IEEE Transactions on Circuits and Systems for Video Technology, IEEE Service Center, Piscataway, NJ, US, vol. 13, No. 7, Jul. 1, 2003 (Jul. 1, 2003), pp. 614-619, XP011221094.

\* cited by examiner

METHOD FOR ENCODING AND DECODING IMAGES, DEVICE FOR ENCODING AND DECODING IMAGES, AND CORRESPONDING COMPUTER PROGRAMS

CROSS-REFERENCE TO RELATED APPLICATIONS

This Application is a Section 371 National Stage Application of International Application No. PCT/FR2016/053136, filed Nov. 29, 2016, which is incorporated by reference in its entirety and published as WO 2017/093653 A1 on Jun. 8, 2017, not in English.

FIELD OF THE INVENTION

The present invention pertains generally to the field of image processing and more precisely to the coding and to the decoding of digital images and of sequences of digital images.

The coding/decoding of digital images applies in particular to images arising from at least one video sequence comprising:
- images arising from one and the same camera and following one another temporally (coding/decoding of 2D type),
- images arising from various cameras oriented according to different views (coding/decoding of 3D type),
- corresponding texture and depth components (coding/decoding of 3D type),
- etc.

The present invention applies in a similar manner to the coding/decoding of images of 2D or 3D type.

The invention can in particular, but not exclusively, apply to the video coding implemented in current AVC and HEVC video coders and their extensions (MVC, 3D-AVC, MV-HEVC, 3D-HEVC, etc.), and to the corresponding decoding.

PRIOR ART

Current video coders (MPEG, H.264, HEVC, etc.) use a blockwise representation of the video sequence. The images are split up into blocks, which are liable to be split up again in a recursive manner. Next, each block is coded by intra-image or inter-image prediction. Thus, certain images are coded by spatial prediction (Intra prediction), other images are also coded by temporal prediction (Inter prediction) with respect to one or more coded-decoded reference images, with the aid of motion compensation known to the person skilled in the art.

A residual block, also called a prediction residual, corresponding to the original block decreased by a prediction, is coded for each block. The residual blocks are transformed with the aid of a mathematical transform operation, and then quantized with the aid of a mathematical quantization operation for example of scalar type. For the sake of simplification, the mathematical transform operation will be called hereinafter 'transform' and the mathematical quantization operation will be called hereinafter 'quantization'. A one-dimensional list of coefficients is obtained on completion of the quantization.

The coefficients of this list are then coded in the form of bits by an entropy coding whose aim is to code the coefficients without loss.

The bits obtained after entropy coding are written into a data signal or stream which is intended to be transmitted to the decoder.

In a manner known per se, such a signal comprises:
- the quantized coefficients contained in the aforementioned list,
- information representative of the mode of coding used, in particular:
  - the mode of prediction (Intra prediction, Inter prediction, default prediction carrying out a prediction for which no information is transmitted to the decoder (known as "skip"));
  - information specifying the type of prediction (orientation, reference image, etc.);
  - the type of splitting of the block;
  - the motion information if necessary;
  - etc.

Once the stream has been received by the decoder, the decoding is done image by image, and for each image, block by block. For each block, the corresponding elements of the stream are read. The inverse quantization, the inverse scan operation, and the inverse transform of the coefficients of the blocks are performed to produce the decoded prediction residual. Next, the prediction of the block is calculated and the block is reconstructed by adding the prediction to the decoded prediction residual.

Admittedly, the conventional coding/decoding technique which has just been described allows improvements in coding performance. According to the video context, it allows in particular:
- an improvement of the quality of the images for a given bitrate of the network used to transmit the images,
- a reduction in the bitrate of transmission of the images for an image quality criterion fixed beforehand.

In the field of video coding, discrete cosine transforms (DCTs) or discrete sine transforms (DSTs), are generally favored, in particular for the following reasons:
- these are block transforms and it is thus easy to manipulate the blocks independently of one another,
- they are efficient for compacting the information in the frequency domain, where the bitrate reduction operation operate,
- they have fast implementation schemes which require of the order of M*log 2(M) operations.

The aforementioned DCT or DST transforms are of separable type.

A separable transform can be applied according to two different cases.

According to a first case, there is undertaken the application of a first transform Al to a residual block x of K pixels which are organized in the form of an M×N matrix, where Al is a data matrix of size M×M and M, N are natural integers greater than or equal to 1. A first transformed block Al·x is obtained on completion of the application of this first transform.

A transposition operation t is thereafter applied to the transformed block Al·x. A transposed block $(Al \cdot x)^t$ is obtained on completion of this transposition.

Finally, a second transform Ac is applied to the transposed block $(Al \cdot x)^t$, where Ac is a data matrix of size N×N. A second transformed block X of K=N×M pixels is obtained on completion of the application of this second transform, such that:

$$X = Ac \cdot (Al \cdot x)^t$$

According to a second case, the order of application of the transforms Al and Ac is reversed. The second transformed block X of K=N×M pixels may then be written in the following manner:

$$X = Al \cdot (Ac \cdot x^t)^t$$

The transformed block X obtained according to this second case is similar to the transformed block X obtained according to the first case, to within a transposition.

In the particular case where the residual block x is square, that is to say M=N, the matrices Al and Ac have the same size.

On decoding, in a manner known per se, transforms inverse to those mentioned hereinabove are applied.

Thus, if the transform has been applied according to the first case, the corresponding inverse transform makes it possible to obtain the residual block x with the aid of the following calculation:

$$x = Al^{-1} \cdot (Ac^{-1} \cdot X)^t$$

Thus, if the transform has been applied according to the second case, the corresponding inverse transform makes it possible to obtain the residual block x with the aid of the following calculation:

$$x = (Ac^{-1} \cdot (Al^{-1} \cdot X)^t)^t$$

$Al^{-1}$ and $Ac^{-1}$ represent the respective inverse transforms of the transforms Al and Ac. They make it possible to obtain the values of the residual block x on the basis of the values of the transformed block X. The matrices $Al^{-1}$ and $Ac^{-1}$ are commonly called inverse matrices of Al and Ac respectively. In the case where the matrices are chosen orthogonal they correspond to the transposed matrices of Al and Ac respectively.

In addition to the transforms of separable type, there also exist transforms of non-separable type, such as for example the Karhunen-Loeve transform (KLT) which is considered to provide an optimal decorrelation of the data of a block considered. The advantage of the non-separable transforms is the ability to exploit correlations between any pair (or more) of data inside a block considered, in contradistinction to transforms of separable type which can only exploit the correlations between data sharing either the same row, or the same column of a block considered through the transforms Al and Ac which act independently. Such a difference renders transforms of non-separable type more efficacious than separable transforms, in particular from the point of view of energy compression and coding performance. On the other hand, the non-separable transforms are very complex, thereby rendering them difficult to implement in current video coders. This is the reason why the transforms of DCT or DST type are currently still favored, all the more as they may in certain particular cases constitute a good approximation of the KLT transform.

A transform of non-separable type may be written mathematically on coding as the multiplication of the residual block x, cast in the form of a vector of dimension 1×K, by a matrix A of size K×K. The transformed block X obtained on completion of the application of this transform may then be written in the following manner:

$$X = A \cdot x$$

On decoding, the inverse transform consists in multiplying the transformed block X by the inverse matrix $A^{-1}$ of A which may be the transpose of A, when A is orthogonal. Such an inverse transform makes it possible to obtain the following residual block x:

$$x = A^{-1} \cdot X$$

Despite the current use of transforms of DCT and DST type in coders available on the market, it is considered that the coding performance is not currently optimized and might be further improved, in particular from the point of view of minimizing the bitrate/distortion cost which is a criterion that is well known to the person skilled in the art.

OBJECT AND SUMMARY OF THE INVENTION

One of the aims of the invention is to remedy drawbacks of the aforementioned prior art.

For this purpose, a subject of the present invention relates to a method of coding at least one image split up into blocks.

Such a coding method is noteworthy in that, for a current block to be coded of the image, it implements the following:

at least one modification of two data of the block by an operation of linear combinations operating on the two data, on completion of which a modified block is obtained, application of a separable transform operation to the data of the modified block, coding of the data obtained subsequent to the application of the separable transform operation.

Such a provision makes it possible to obtain, utilizing a separable transform such as conventionally used in the current and forthcoming coding/decoding standards, an improved coding gain approaching that obtained by applying a transform operation of KLT type directly to the data of the block, which transform is for its part non-separable and therefore requires a high number of calculations on the data of the block.

Furthermore, the improved gain according to the invention is obtained utilizing low calculational complexity, by virtue of the fact that the operation of linear combinations is applied only to certain data of the block, prior to the application of the separable transform operation. Such a modification advantageously makes it possible to adapt the data of the block in the spatial domain, in such a way that when applying a transform operation of separable type to the data of the modified block, the gain in terms of coding of the data of the block is improved.

A separable transform such as this can be of the trigonometric type, such as for example a DCT, DST transform or else of the non-trigonometric type, such as for example a transform of the RDOT (Rate-Distorsion Optimized Transform), Hadamard type, etc.

According to a particular embodiment, the operation of linear combinations comprises the calculation of a first weighted sum and of a second weighted sum of the two data of the block, the two weighting data used in the first weighted sum being equal in absolute value to the two weighting data used in the second weighted sum.

Such a provision advantageously makes it possible to preserve, once the modification of the data of the block has been performed, the block's energy which was obtained before this modification.

According to another particular embodiment, the two data of the block, to which the first weighted sum and the second weighted sum are applied, are situated neither in the same row, nor in the same column of the block.

Such a provision makes it possible to obtain the best compromise between an appreciable improvement in the coding gain and a low complexity of calculations on the data of the block.

The various aforementioned modes or characteristics of embodiment can be added independently or in combination with one another, to the steps of the coding method such as defined hereinabove.

The invention also relates to a device for coding at least one image split up into blocks.

The coding device according to the invention is noteworthy in that it comprises a processing circuit which is designed to:

modify two data of the block at least once by an operation of linear combinations operating on the two data, on completion of which a modified block is obtained, apply a separable transform operation to the data of the modified block, code the data obtained subsequent to the application of the separable transform operation.

Such a coding device is in particular able to implement the aforementioned coding method.

The invention also relates to a method for decoding a data signal representative of at least one image split up into blocks, implementing, for a current block to be decoded, the following:

determination, in the data signal, of a coded-data block associated with the current block to be decoded, application of a separable transform operation to the coded data of the block determined, on completion of which a transformed data block is obtained.

Such a decoding method is noteworthy in that it implements a reconstruction of the current block by means of at least one modification of two data of the transformed data block, by an operation of linear combinations operating on the two data.

According to a particular embodiment, the operation of linear combinations comprises the calculation of a first weighted sum and of a second weighted sum of the two data of the transformed data block, the two weighting data used in the first weighted sum being equal in absolute value to the two weighting data used in the second weighted sum.

According to another particular embodiment, the two data of the transformed data block, to which the first weighted sum and the second weighted sum are applied, are situated neither in the same row, nor in the same column of the block.

The various aforementioned embodiments or characteristics of embodiment can be added independently or in combination with one another to the steps of the decoding method such as defined hereinabove.

The invention also relates to a device for decoding a data signal representative of at least one image split up into blocks, comprising a processing circuit which, for a current block to be decoded, is designed to:

determine, in the data signal, a coded-data block associated with the current block to be decoded, apply a separable transform operation to the coded data of the block determined, on completion of which a transformed data block is obtained.

The decoding device according to the invention is noteworthy in that the processing circuit is designed to reconstruct the current block by means of at least one modification of two data of the transformed data block, by an operation of linear combinations operating on the two data.

Such a decoding device is in particular able to implement the aforementioned decoding method.

The invention further relates to a computer program comprising instructions for implementing one of the coding and decoding methods according to the invention, when it is executed on a computer.

This program can use any programming language, and be in the form of source code, object code, or of code intermediate between source code and object code, such as in a partially compiled form, or in any other desirable form.

The invention also envisages a recording medium readable by a computer on which a computer program is recorded, this program comprising instructions suitable for the implementation of one of the coding or decoding methods according to the invention, such as described hereinabove.

The invention also envisages a recording medium readable by a computer on which is recorded a computer program, this program comprising instructions suitable for the implementation of the coding or decoding method according to the invention, such as described hereinabove.

The recording medium can be any entity or device capable of storing the program. For example, the medium can comprise a storage means, such as a ROM, for example a CD ROM or a microelectronic circuit ROM, a USB key or a magnetic recording means, for example a hard disk.

Moreover, the recording medium can be a transmissible medium such as an electrical or optical signal, which can be conveyed via an electrical or optical cable, by radio or by other means. The program according to the invention may in particular be downloaded from a network of Internet type.

Alternatively, the recording medium can be an integrated circuit into which the program is incorporated, the circuit being suitable for executing or for being used in the execution of the aforementioned coding or decoding method.

BRIEF DESCRIPTION OF THE DRAWINGS

Other characteristics and advantages will become apparent on reading a preferred embodiment described with reference to the figures in which:

FIG. 3 represents an exemplary current block to be coded, FIG. 4A represents a first type of arrangement of data to be modified in the block of FIG. 3, FIG. 4B represents a second type of arrangement of data to be modified in the block of FIG. 3, FIG. 4C represents a third type of arrangement of data to be modified in the block of FIG. 3.

DETAILED DESCRIPTION OF THE CODING PART

An embodiment of the invention will now be described, in which the coding method according to the invention is used to code an image or a sequence of images according to a binary stream close to that obtained by a coding complying for example with the HEVC standard.

Figure 1:
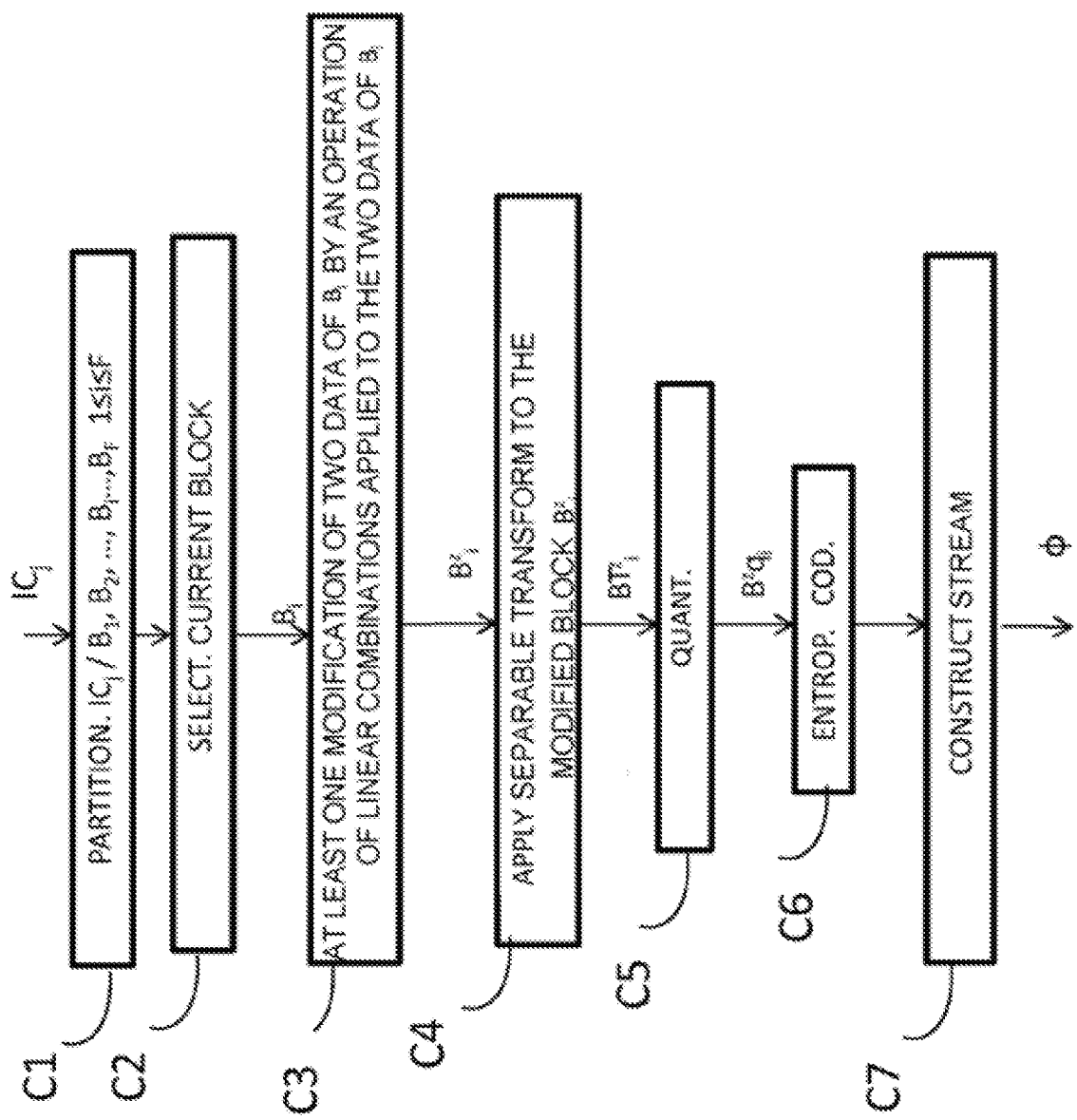
FIG. 1 represents the steps of the coding method according to the invention.

In this embodiment, the coding method according to the invention is for example implemented in a software or hardware manner by modifications of a coder initially complying with the HEVC standard. The coding method according to the invention is represented in the form of an algorithm comprising steps C1 to C7 such as are represented in FIG. 1.

Figure 2:
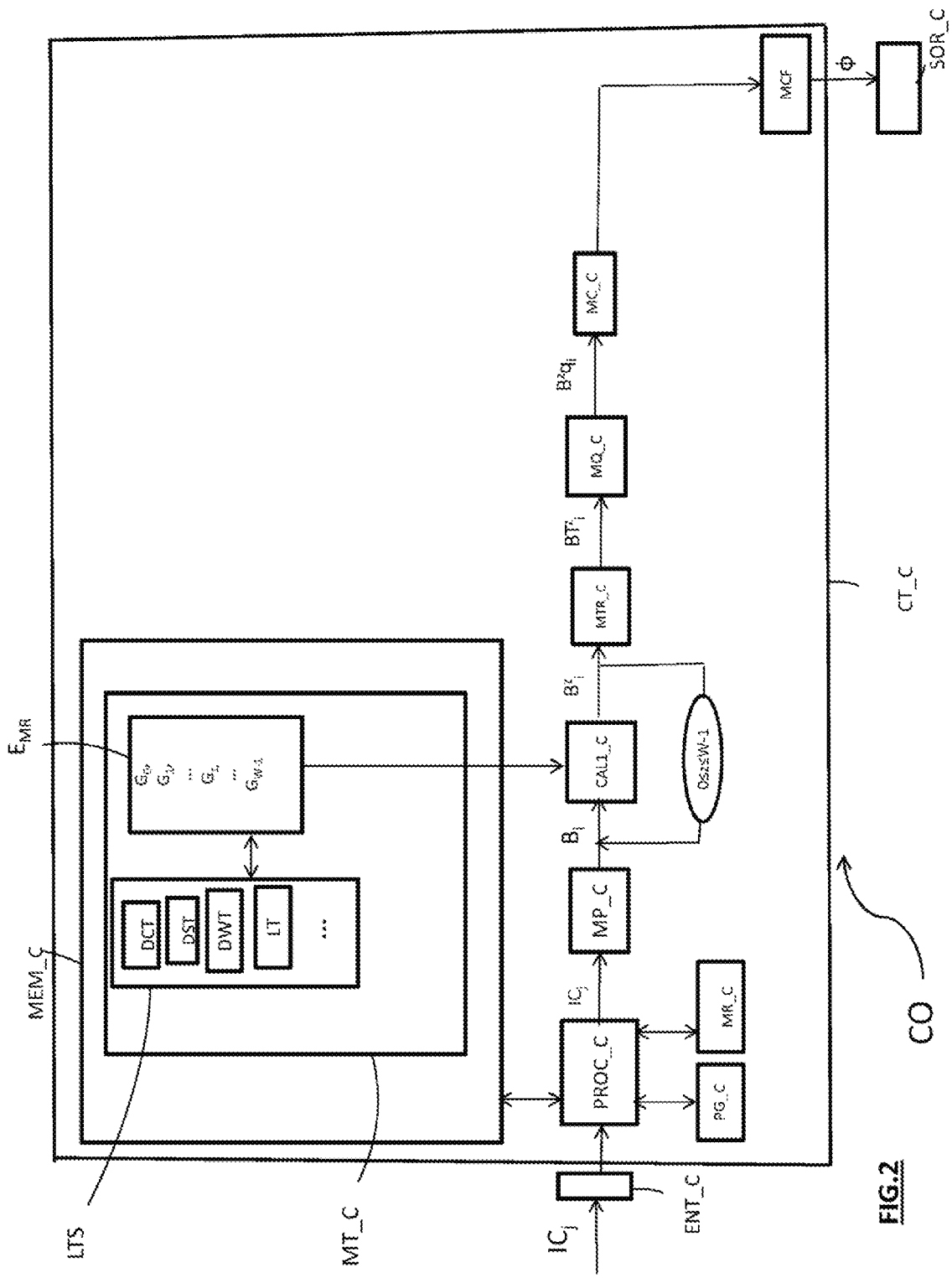
FIG. 2 represents an embodiment of a coding device according to the invention.

According to the embodiment of the invention, the coding method according to the invention is implemented in a coding device CO represented in FIG. 2.

As illustrated in FIG. 2, such a coder device comprises:
an input ENT_C for receiving a current image to be coded, a processing circuit CT_C for implementing the coding method according to the invention, the processing circuit CT_C containing:
   a memory MEM_C comprising a buffer memory MT_C,
   a processor PROC_C driven by a computer program PG_C,
an output SOR_C for delivering a coded signal or stream containing the data obtained on completion of the coding of the current image.

On initialization, the code instructions of the computer program PG_C are for example loaded into a RAM memory, MR_C, before being executed by the processing circuit CT_C.

The coding method represented in FIG. 1 applies to any current image $IC_j$ which is fixed or else which forms part of a sequence of L images $IC_1, \ldots, IC_j, \ldots, IC_L$ ($1 \le j \le L$) to be coded.

In the course of a step C1 represented in FIG. 1, there is undertaken, in a manner known per se, the partitioning of a current image $IC_j$ into a plurality of blocks $B_1, B_2, \ldots, B_i, \ldots, B_F$ ($1 \le i \le F$), for example of size 4×4 pixels. Such a partitioning step is implemented by a partitioning device MP_C represented in FIG. 2, which device is driven by the processor PROC_C.

It should be noted that within the meaning of the invention, the term "block" signifies coding unit. The latter terminology is in particular used in the HEVC standard "ISO/IEC/23008-2 Recommendation ITU-T H.265 High Efficiency Video Coding (HEVC)".

In particular, such a coding unit groups together sets of pixels of rectangular or square shape, also called blocks or macroblocks.

Such a coding unit could, in a future standard, also group together sets of pixels exhibiting other geometric shapes.

Said blocks $B_1, B_2, \ldots, B_i, \ldots, B_F$ are intended to be coded according to a predetermined order of traversal, which is for example of the lexicographic type. This signifies that the blocks are coded one after another, from left to right, and then from top to bottom.

Other types of traversal are of course possible. Thus, it is possible to split the image $IC_j$ up into several sub-images called slices and to apply a splitting of this type to each sub-image independently. It is also possible to code not a succession of rows, as explained hereinabove, but a succession of columns. It is also possible to traverse the rows or columns in either direction.

Each block may moreover be itself divided into sub-blocks which are themselves subdividable.

In the course of a step C2 represented in FIG. 1, the coder CO selects as current block a first block to be coded $B_i$ of the image $IC_j$, such as for example the first block $B_1$.

Figures 3, 4A, 4B, 4C:
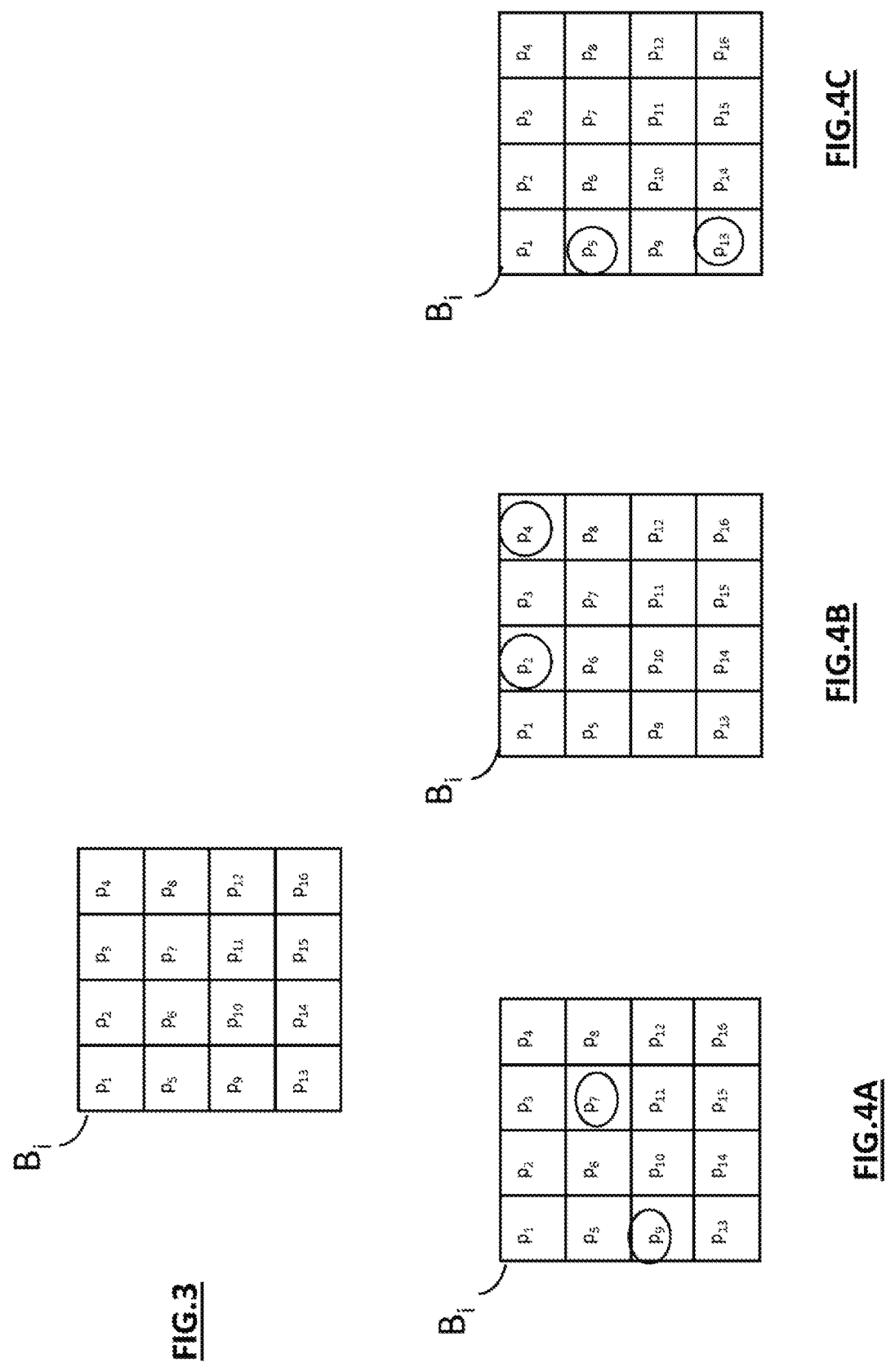

An example of such a block is represented in FIG. 3. It contains a number P of pixels $p_1, p_2, \ldots, p_P$, with P>1.

In the example represented in FIG. 3, P=16.

In accordance with the invention, in the course of a step C3 represented in FIG. 1, there is undertaken at least one modification of two data of the block $B_i$ by an operation of linear combinations operating on said two data. The operation of linear combinations comprises the calculation of a first weighted sum and of a second weighted sum each applied to said two data of the block $B_i$.

On completion of step C3, a modified block $B_i^z$ is obtained. Step C3 is implemented by a calculation device CAL1_C represented in FIG. 2, which device is driven by the processor PROC_C.

In the example described here, by "data" is meant the pixels of the current block $B_i$.

It should however be noted that, by "data" is also meant the pixels of a predicted block obtained with the aid of a prediction of the current block $B_i$ with respect to a predictor block which is selected subsequent to setting various inter, intra modes or other predetermined modes of prediction into competition, for example by minimizing a distortion bitrate criterion well known to the person skilled in the art.

According to a first preferential example such as represented in FIG. 4A, the at least two data of the block $B_i$, to which the first weighted sum and the second weighted sum are applied, are situated neither in the same row, nor in the same column of the current block $B_i$.

In the example represented in FIG. 4A, the two data of the block $B_i$ to which the first weighted sum and the second weighted sum are applied, are for example the pixels $p_7$ and $p_9$ surrounded by a solid-line circle.

According to a second example such as represented in FIG. 4B, the two data of the current block $B_i$, to which the first weighted sum and the second weighted sum are applied, are situated in one and the same row of the current block $B_i$. These two data may or may not be situated alongside one another.

In the example represented in FIG. 4B, the two data of the block $B_i$, to which the first weighted sum and the second weighted sum are applied, are for example the pixels $p_2$ and $p_4$ surrounded by a solid-line circle.

According to a third example such as represented in FIG. 4C, the two data of the current block $B_i$, to which the first weighted sum and the second weighted sum are applied, are situated in one and the same column of the current block $B_i$. These two data may or may not be situated alongside one another.

In the example represented in FIG. 4C, the two data of the block $B_i$, to which the first weighted sum and the second weighted sum are applied, are for example the pixels $p_5$ and $p_{13}$ surrounded by a solid-line circle.

In accordance with the invention, the two weighting data used in the first weighted sum are equal in absolute value to the two weighting data used in the second weighted sum.

The calculation of the first and second weighted sums uses a rotation matrix $G_z$ belonging to a set $E_{MR}$ comprising W rotation matrices $G_0, G_1, \ldots, G_z, \ldots, G_{W-1}$ where $0 < z < W-1$ previously stored in the buffer memory MT_C of FIG. 2. A rotation matrix $G_z$ considered in this set comprises M rows and N columns, with $M \ge 1$ and $N \ge 1$. Such a rotation matrix is also called an elementary rotation matrix or Givens matrix. It is expressed in the following manner:

$$G_z = \begin{bmatrix} 1 & \ldots & 0 & \ldots & 0 & \ldots & 0 \\ \vdots & \ddots & \vdots & & \vdots & & \vdots \\ 0 & \ldots & C & \ldots & -S & \ldots & 0 \\ \vdots & & \vdots & \ddots & \vdots & & \vdots \\ 0 & \ldots & S & \ldots & C & \ldots & 0 \\ \vdots & & \vdots & & \vdots & \ddots & \vdots \\ 0 & \ldots & 0 & \ldots & 0 & \ldots & 1 \end{bmatrix}$$

where:
C and —S, which are situated in one and the same row $m_1$ ($1 \le m_1 \le M$) of the matrix $G_z$, represent the values of the weighting data for the first weighted sum, and S and C which are also situated in one and the same row $m_2$ ($1 \leq m_2 \leq M$) of the matrix $G_z$, represent the values of the weighting data for the second weighted sum.

This matrix differs from the identity matrix only for the following four values:
- the two values C situated on the diagonal in row $m_1$ and $m_2$,
- and the two values equal in absolute value to S and situated at the respective coordinates ($m_1, m_2$) and ($m_2, m_1$) in the matrix $G_z$.

The matrix $G_z$ can also be expressed in the form:

$$G_z = \begin{bmatrix} 1 & \cdots & 0 & \cdots & 0 & \cdots & 0 \\ \vdots & \ddots & \vdots & & \vdots & & \vdots \\ 0 & \cdots & C & \cdots & S & \cdots & 0 \\ \vdots & & \vdots & \ddots & \vdots & & \vdots \\ 0 & \cdots & S & \cdots & -C & \cdots & 0 \\ \vdots & & \vdots & & \vdots & \ddots & \vdots \\ 0 & \cdots & 0 & \cdots & 0 & \cdots & 1 \end{bmatrix}$$

In a preferred embodiment of the invention, $C = \cos \theta$ and $S = \sin \theta$, where $\theta$ is the angle of the cosine and sine of the rotation matrix $G_z$, with $\theta$ a real-numbered angular value.

In another embodiment, C and S are scaled values of $\cos \theta$ and $\sin \theta$ and approximated to a near integer. In this case, $C*C+S*S$ will lie between $SC*(SC-\text{sqrt}(2))$ and $SC*(SC+\text{sqrt}(2))$, with C and S being approximately equal to $C=SC*\cos \theta$ and $S=SC*\sin \theta$.

If a single modification of two data of the block $B_i$ is implemented, the calculation of the first and second weighted sums uses the first rotation matrix $G_0$ of the aforementioned set $E_{MR}$ and applies the matrix $G_0$ to the block $B_i$. In order to implement the calculation of the first and second weighted sums, the current block $B_i$ is vectorized. For this purpose the matrix of pixels formed by the block $B_i$ such as represented in FIG. 3 is vectorized so as to obtain a $$\text{vector } Bv_i = \begin{bmatrix} p_1 & p_2 & p_3 & p_4 \\ p_5 & p_6 & p_7 & p_8 \\ p_9 & p_{10} & p_{11} & p_{12} \\ p_{13} & p_{14} & p_{15} & p_{16} \end{bmatrix}^v = \begin{bmatrix} p_1 \\ p_2 \\ p_3 \\ p_4 \\ p_5 \\ p_6 \\ p_7 \\ p_8 \\ p_9 \\ p_{10} \\ p_{11} \\ p_{12} \\ p_{13} \\ p_{14} \\ p_{15} \\ p_{16} \end{bmatrix}$$

The calculation of the first and second weighted sums amounts to applying the aforementioned first rotation matrix $G_0$ to the current vector $Bv_i$ as hereinbelow, thereby amounting to applying a rotation affecting the indices $m_1$ and $m_2$ of this vector:

$$G_0 * BV_i = \begin{bmatrix} 1 & \cdots & 0 & \cdots & 0 & \cdots & 0 \\ \vdots & \ddots & \vdots & & \vdots & & \vdots \\ 0 & \cdots & c & \cdots & -s & \cdots & 0 \\ \vdots & & \vdots & \ddots & \vdots & & \vdots \\ 0 & \cdots & s & \cdots & c & \cdots & 0 \\ \vdots & & \vdots & & \vdots & \ddots & \vdots \\ 0 & \cdots & 0 & \cdots & 0 & \cdots & 1 \end{bmatrix} \begin{bmatrix} p_1 \\ p_2 \\ \vdots \\ p_{m1} \\ \vdots \\ p_{m2} \\ \vdots \\ p_{16} \end{bmatrix}$$

The modified block $B^0_i$ is then obtained in the following form:

$$B^0_i = G_0 * Bv_i = \begin{bmatrix} p_1 \\ p_2 \\ \vdots \\ cp_{m1} - sp_{m2} \\ \vdots \\ sp_{m1} + cp_{m2} \\ \vdots \\ p_{16} \end{bmatrix}$$

Such a calculation thus makes it possible to adapt the data of the current block $B_i$ in the spatial domain before the following step C4 of applying a transform of separable type, such as represented in FIG. 1.

The use of such a rotation matrix $G_0$ does not render the calculations too complex since they are actually implemented on only two pixels of the current block $B_i$, as represented in FIGS. 4A to 4C and induce two linear combinations as expressed in the previous calculation.

If a second modification of two data of the block $B_i$ is implemented, the calculation of the first and second weighted sums during this second modification uses the second rotation matrix $G_1$ of the aforementioned set $E_{MR}$ and applies the matrices $G_0$ and $G_1$ successively to the vectorized block $Bv_i$ so as to obtain a modified block $B^1_i = G_1 * G_0 * Bv_i$. ⋯

If a $z^{th}$ modification of two data of the block $B_i$ is implemented, the calculation of the first and second weighted sums during this $z^{th}$ modification uses the $z+1^{th}$ rotation matrix $G_z$ of the aforementioned set $E_{MR}$ and applies the matrices $G_0, G_1, \ldots, G_z$ successively to the vectorized block $Bv_i$ so as to obtain a modified block $B^z_i = G_z * \ldots * G_1 * G_0 * Bv_i$. ⋯

If a $W-1^{th}$ modification of two data of the block $B_i$ is implemented, the calculation of the first and second weighted sums during this $W-1^{t''}$ modification uses the $W^{th}$ rotation matrix $G_{W-1}$ of the aforementioned set $E_{MR}$ and applies the matrices $G_0, G_1, \ldots, G_z, \ldots, G_{W-1}$ successively to the vectorized block $Bv_i$ so as to obtain a modified block $B^{W-1}_i = G_{W-1} * \ldots * G_z * \ldots * G_1 * G_0 * Bv_i$.

The predetermined number W of rotation matrices to be used to modify a current block $B_i$ can depend, according to three possible options:
- either on the type of separable transform to be applied in the following step C4,
- or on the mode of prediction selected in the case where the current block $B_i$ is predicted,
- or both on the type of separable transform and on the mode of prediction selected.

In the set $E_{MR}$ of W rotation matrices, each matrix is assigned to particular values of C and S (a particular value of angle θ in the preferred embodiment) and to a pair of indices of data of the vectorized block $Bv_i$. Certain pairs of values C and S and/or certain pairs of indices of data of the vectorized block $Bv_i$ can be common to two or more rotation matrices.

The number W of rotation matrices is determined prior to the coding by a learning algorithm implemented on a plurality of vectorized blocks, in such a way that the successive application of rotation matrices $G_{W-1}* \ldots *G_z*G_{z-1}* \ldots *G_2*G_1*G_0$ to the blocks $Bv_i$ makes it possible to obtain a compromise—coding gain $GC^{W-1}{}_i$/W rotation matrices $G_0$ to $G_{W-1}$—which is optimal with respect to the gain obtained with a KLT transform applied directly to the current block $B_i$.

The coding gain $GC^{W-1}{}_i$ can be likened to the following quantity:

$$GC^{W-1}i = -\frac{1}{K}\sum_{i=0}^{K-1}\log_{10}R(i,i)$$

where:

$$R(i,i) = \frac{1}{F}\sum_{i=0}^{F-1}(G_{W-1} \ldots G_z \ldots G_1G_0Bv_i)(G_{W-1} \ldots G_z \ldots G_1G_0Bv_i)^t$$

represents the autocorrelation matrix of the number F of modified blocks $B^{W-1}{}_1, B^{W-1}{}_2, \ldots, B^{W-1}{}_i, \ldots, B^{W-1}{}_F$, $((G_{W-1} \ldots G_z \ldots G_1G_0Bv_i)^t$ is the transpose of $(G_{W-1} \ldots G_z \ldots G_1G_0Bv_i)$, K is the number of pixels of the autocorrelation matrix R(i,i).

In the course of step C4 of FIG. 1, for a modified block $B^z{}_i$ considered, a separable transform is applied to the modified block $B^z{}_i$. In a manner known per se, as a function of the context or of the coding standard used, such a separable transform is for example a transform of DCT, DST type, of DWT type (the abbreviation standing for "Discrete Wavelet Transform") or else of LT type (the abbreviation standing for "Lapped Transform"). These transforms form part of a list of separable transforms LTS which is stored beforehand in the buffer memory MT_C of the coder CO of FIG. 2.

A transformed data block $BT^z{}_i$ is obtained on completion of step C4.

Such an operation is performed by a transform calculation device MTR_C, such as represented in FIG. 2, which device is driven by the processor PROC_C.

In the course of a step C5 represented in FIG. 1, there is undertaken the quantization of the data of the transformed block $BT^z{}_i$ according to a conventional quantization operation, such as for example a scalar or vector quantization. A block $B^zq_i$ of quantized coefficients is then obtained.

Step C5 is implemented by a quantization device MQ_C such as represented in FIG. 2, which device is driven by the processor PROC_C.

In a manner known per se, in the course of a step C6 represented in FIG. 1, there is undertaken the coding of the data of the block $B^zq_i$. Such a coding is for example an entropy coding of CABAC type ("Context Adaptive Binary Arithmetic Coder" in English) or else an entropy coding of arithmetic or Huffman type. Coded data associated with the current block $B_i$ are obtained on completion of step C6.

Step C6 is implemented by a coding device MC_C represented in FIG. 2, which device is driven by the processor PROC_C.

In the course of a step C7 represented in FIG. 1, there is undertaken the construction of a data signal or stream φ which contains the coded data, obtained on completion of the aforementioned step C6, of the current block R.

Step C7 is implemented by a data signal construction device MCF, such as represented in FIG. 2, which device is driven by the processor PROC_C.

The data signal φ is thereafter delivered via the output SOR_C of the coder CO of FIG. 2. Such a signal is either stored in the buffer memory MT_C of the coder CO of FIG. 2, or transmitted by a communication network (not represented) to a remote terminal. The latter comprises the decoder DO represented in FIG. 5.

In a manner known per se, the data signal φ furthermore comprises certain information encoded by the coder CO, such as the type of prediction (Inter or Intra) which may have been applied, and, if relevant, the mode of prediction selected, the index of the selected predictor block, the reference image index and the motion vector used in the Inter mode of prediction, an index H associated with the separable transform applied in the course of the aforementioned step C4.

The decoding of the block $B_i$ is conventionally undertaken thereafter. A decoded block $BD_i$ is then obtained. It should be noted that the decoded block $BD_i$ is the same as the decoded block obtained on completion of the method of decoding the image $IC_j$, which will be described later in the description. The decoded block $BD_i$ is thus rendered available to be used by the coder CO of FIG. 2.

The coding steps C1 to C7 which have just been described hereinabove are thereafter implemented for each of the blocks $B_1, B_2, \ldots, B_i, \ldots, B_F$ to be coded of the current image $IC_j$ considered, in a predetermined order which is for example lexicographic order.

Two exemplary embodiments of the invention in the case of an HEVC coding implementing a prediction of Intra type will now be described hereinbelow.

In accordance with the first example, the current block $B_i$ to be coded, obtained on completion of the partitioning step C1 of FIG. 1 and selected by the coder in step C2, is a 4×4 block such as that represented in FIG. 3.

In the course of a prediction step, not represented, there is conventionally undertaken the selection of an Intra mode of prediction from among several available modes of Intra prediction which, in a manner known per se, are each defined by a predetermined direction of prediction. In the case of the Intra prediction proposed in the HEVC standard, there exist thirty-five possible modes of prediction $DPI_0$, $DPI_1, \ldots, DPI_{34}$, thus amounting to determining thirty-five available candidate predictor blocks for the prediction of the current block $B_i$. The prediction step consists in selecting, from among the available candidate predictor blocks, the candidate predictor block which minimizes a performance criterion in respect of coding carried out in accordance with the method of FIG. 1. Such a criterion is for example:

the bitrate-distortion compromise calculated between the current block $B_i$ and each of said available candidate predictor blocks, or the sum of the absolute values of the differences between the current block $B_i$ and each of said available candidate predictor blocks.

This particular candidate block is called the optimal predictor block $BP_{opt}$, which is therefore associated with an optimal Intra prediction direction, for example the direction $DPI_0$.

In the course of a following step, not represented, there is undertaken the calculation of the difference between the current block $B_i$ and the predictor block $BP_{opt}$ obtained so as to obtain a residual block $Br_i$. The current residual block $Br_i$ comprises sixteen pixels.

In the course of step C3 of FIG. 1, there is undertaken at least one modification of two data of the residual block $Br_i$ by an operation of linear combinations operating on said two data. The operation of linear combinations comprises the calculation of a first weighted sum and of a second weighted sum each applied to said two data of the residual block.

In this example, it has been evaluated beforehand that the successive application of rotation matrices $G_{W-1}^* \ldots {}^*G_z^*G_{z-1}^{**}G_2^*G_1^*G_0$ to the blocks $Bv_i$ makes it possible to obtain a compromise—coding gain $GC^{35}_i/36$ rotation matrices $G_0$ to $G_{35}$—which is optimal with respect to the gain obtained with a KLT transform applied directly to the current block R.

The results of a prior evaluation such as this are presented hereinbelow in table T1:

| | T1 | | |
|---|---|---|---|
| Iteration | $GC_i$ (dB) | pair of pixels $(p_{m1}; p_{m2})$ considered in the residual block | $\theta$ (°) |
| 0 | 4.916 | | |
| 1 | 4.9241 | $p_3; p_4$ | -3.49 |
| 2 | 4.9348 | $p_7; p_8$ | -2.63 |
| 3 | 4.9415 | $p_{11}; p_{12}$ | -1.76 |
| 4 | 4.9475 | $p_{12}; p_{16}$ | -2.05 |
| 5 | 4.9515 | $p_9; p_{13}$ | -2.63 |
| 6 | 4.9591 | $p_{10}; p_{14}$ | -2.23 |
| 7 | 4.9636 | $p_{11}; p_{12}$ | -1.48 |
| 8 | 4.9653 | $p_{15}; p_{16}$ | -1.01 |
| ... | ... | ... | ... |
| 30 | 5.006 | $p_3; p_7$ | 0.9 |
| 31 | 5.0074 | $p_3; p_4$ | -1.37 |
| 32 | 5.0083 | $p_2; p_6$ | 0.79 |
| 33 | 5.0097 | $p_3; p_7$ | 1.04 |
| 34 | 5.0105 | $p_2; p_4$ | -1.26 |
| 35 | 5.0113 | $p_9; p_{13}$ | -1.12 |

In accordance with table T1, at iteration 0, the gain $GC_i$ has been calculated conventionally by taking into account solely the residual block $Br_i$. The gain $GC_i$ obtained is such that $GC_i$=4.916 dB. This gain is compared with the gain $GC'_i$ calculated when a transform of KLT type is applied to the residual block $Br_i$. The gain $GC'_i$ obtained is such that $GC'_i$=5.141 dB and is therefore much greater than the gain $GC_i$.

It is noted that at each following iteration, represented in table T1, the gain $GC_i$ is increased. After the $35^{th}$ iteration implemented by the learning algorithm, the gain $GC_i$ is optimized, according to a satisfactory compromise of coding gain/number of rotation matrices used. To obtain this gain, thirty-six rotation matrices $G_0$ to $G_{35}$ have been applied to the vectorized residual block: firstly the matrix $G_0$ directly to the vectorized residual block $Brv_i$, then the matrix $G_1$ to the modified residual block $B^0r_i, \ldots$, and finally the matrix $G_{35}$ to the modified residual block $B^{34}r_i$.

In this embodiment, the rotation matrices have been applied solely to pixels sharing the same row or the same column of the residual block/modified residual considered.

Having regard to the evaluation results presented in table T1, the set $E_{MR}$ of rotation matrices which is stored in the buffer memory MT_C of the coder CO of FIG. 2 is supplied prior to the coding with these thirty-six rotation matrices $G_0$ to $G_{35}$. These latter are stored in association with the DST transform and/or with the direction of Intra prediction $DPI_0$, in the buffer memory MT_C of the coder CO of FIG. 2. The rotation matrices $G_0$ to $G_{35}$ are also stored respectively in association with the indices m1, m2 of each of the two data of the residual block/modified residual that they affect.

It follows from this that on completion of step C3, a modified residual block $B^{35}r_i$, such that $B^{35}r_i=G_{35}*G_{34}*G_{33}* \ldots *G_0*Brv_i$ is then obtained, where $Brv_i$ corresponds to the residual block vectorized in the form of a column matrix.

In the course of step C4 of FIG. 1, there is undertaken the application to the modified residual block $Br^{35}_i$ of the separable transform some examples of which were given hereinabove. It is assumed, in this example, that the separable transform to be applied in step C4 is of DST type for its row and column matrices Al and Ac.

A transformed data block $BT^{35}_i$ is obtained on completion of step C4. In the course of step C5 of FIG. 1, there is undertaken the quantization of the data of the transformed block $BT^{35}_i$.

A block $B^{35}q_i$ of quantized coefficients is then obtained.

In the course of step C6 of FIG. 1, there is undertaken the coding of the data of the block $B^{35}q_i$.

In the course of step C7 of FIG. 1, there is undertaken the construction of the data signal or stream $\phi$ which contains the coded data on completion of the aforementioned coding step C6.

The coding steps C1 to C7 of FIG. 1 are thereafter implemented for each of the blocks $B_1, B_2, \ldots, B_i, \ldots, B_F$ to be coded of the current image $IC_j$ considered, in a predetermined order which is for example lexicographic order.

In accordance with the second example which will be described hereinbelow, the latter is distinguished from the first example by the fact that the optimal predictor block $BP_{opt}$ is associated with an optimal Intra prediction direction which is for example the direction of Intra prediction $DPI_{34}$.

In the course of step C3 of FIG. 1, there is undertaken at least one modification of two data of the residual block $Br_i$ by an operation of linear combinations operating on said two data. The operation of linear combinations comprises the calculation of a first weighted sum and of a second weighted sum each applied to said two data of the residual block.

In this example, it has been evaluated beforehand that the successive application of rotation matrices $G_{W-1}^* \ldots {}^*G_z^*G_{z-1}^* \ldots {}^*G_2^*G_1^*G_0$ to the blocks $Bv_i$ makes it possible to obtain a compromise—coding gain $GC^{120}_i/121$ rotation matrices $G_0$ to $G_{120}$—which is optimal with respect to the gain obtained with a KLT transform applied directly to the current block $B_i$.

The results of such a prior evaluation are presented hereinbelow in two tables T2 and T3. Table T2 corresponds to a first variant in which the rotation matrices have been applied solely to pixels sharing the same row or the same column of the residual block/modified residual considered. Table T3 corresponds to a second variant in which the rotation matrices have been applied:

at a given iteration, to pixels sharing the same row or the same column of the residual block/modified residual considered, at another given iteration, to pixels sharing neither the same row, nor the same column of the residual block/modified residual considered.

In table T3, the iterations for which a rotation matrix is applied to pixels sharing neither the same row nor the same column of the residual block/modified residual are represented in bold.

|  | T2 | | | T3 | | |
| --- | --- | --- | --- | --- | --- | --- |
| Iteration | $GC_i$ (dB) | pair of pixels $(p_{m1}; p_{m2})$ considered in the residual block | θ (°) | $GC_i$ (dB) | pair of pixels $(p_{m1}; p_{m2})$ considered in the residual block | θ (°) |
| 0 | 4.4806 | | | 4.4806 | | |
| 1 | 4.4938 | $p_{13}; p_{14}$ | −3.92 | 4.4955 | $p_9; p_{15}$ | 4.25 |
| 2 | 4.5084 | $p_{14}; p_{15}$ | −2.95 | 4.5064 | $p_1; p_6$ | −6.84 |
| 3 | 4.5328 | $p_{15}; p_{16}$ | −4.03 | 4.5244 | $p_1; p_5$ | 8.75 |
| 4 | 4.5441 | $p_{14}; p_{15}$ | −2.66 | 4.5369 | $p_5; p_9$ | 5.62 |
| 5 | 4.5564 | $p_{13}; p_{14}$ | −3.92 | 4.5459 | $p_6; p_{11}$ | 3.42 |
| 6 | 4.5654 | $p_6; p_{10}$ | 3.82 | 4.5561 | $p_9; p_{13}$ | 4.43 |
| 7 | 4.5736 | $p_1; p_5$ | 5.69 | 4.5662 | $p_3; p_{12}$ | 3.67 |
| 8 | 4.5897 | $p_5; p_9$ | 6.52 | 4.5746 | $p_{15}; p_{16}$ | −2.34 |
| ... | ... | ... | ... | ... | ... | ... |
| 115 | 4.7762 | $p_1; p_2$ | 0.83 | 4.9005 | $p_1; p_{13}$ | 1.66 |
| 116 | 4.7764 | $p_7; p_{15}$ | 0.47 | 4.9013 | $p_{11}; p_{16}$ | 0.76 |
| 117 | 4.7767 | $p_7; p_8$ | −0.61 | 4.9019 | $p_1; p_{11}$ | −0.97 |
| 118 | 4.777 | $p_4; p_8$ | 0.68 | 4.9028 | $p_2; p_7$ | −1.22 |
| 119 | 4.7773 | $p_3; p_{11}$ | 0.65 | 4.9039 | $p_2; p_6$ | 1.37 |
| 120 | 4.7776 | $p_2; p_{10}$ | 0.76 | 4.9048 | $p_5; p_6$ | −1.22 |

In a manner corresponding to the first example described with reference to table T1, at iteration 0, the gain $GC_i$ has been calculated conventionally by taking into account solely the residual block $Br_i$. The gain $GC_i$ obtained is such that $GC_i$=4.4806 dB. This gain is compared with the gain $GC'_i$ calculated when a transform of KLT type is applied to the residual block $Br_i$. The gain $GC'_i$ obtained is such that $GC'_i$=5.152 dB and is therefore much greater than the gain $GC_i$.

It is noted that at each following iteration represented in table T2 or T3, the gain $GC_i$ is increased. After the $120^{th}$ iteration implemented by the learning algorithm, the gain $GC_i$ is optimized, according to a satisfactory compromise of coding gain/number of rotation matrices used. To obtain this gain, a hundred and twenty one rotation matrices $G_0$ to $G_{120}$ were applied to the vectorized residual block: firstly the matrix $G_0$ directly to the vectorized residual block $Brv_k$, then the matrix $G_1$ to the modified residual block $B^0r_i$, ..., and finally the matrix $G_{120}$ to the modified residual block $B^{119}r_i$.

It should be noted that the gain $GC_i$ obtained on completion of the 120 iterations is higher in the case where certain rotation matrices are applied to pixels sharing neither the same row, nor the same column of the residual block/modified residual (table T3) than in the case where the rotation matrices are applied systematically to pixels sharing the same row or the same column of the residual block/modified residual considered (table T2).

Having regard to the evaluation results presented in tables T2 and T3, the set $E_{MR}$ of rotation matrices which is stored in the buffer memory MT_C of the coder CO of FIG. 2 is supplied prior to the coding with these hundred and twenty one rotation matrices $G_0$ to $G_{120}$. These latter are stored in association with the DST transform and/or with the direction of Intra prediction $DPI_{34}$, in the buffer memory MT_C of the coder CO of FIG. 2. The rotation matrices $G_0$ to $G_{120}$ are also stored respectively in association with the indices m1, m2 of each of the two data of the residual block/modified residual that they affect.

It follows from this that on completion of step C3, a modified residual block $B^{120}r_i$, such that $B^{120}r_i = G_{120}*G_{119}*G_{118}* \ldots *G_0*Brv_i$ is then obtained, where $Brv_i$ corresponds to the residual block vectorized in the form of a column matrix.

In the course of step C4 of FIG. 1, there is undertaken the application to the modified residual block $Br^{120}_i$ of the separable transform some examples of which were given hereinabove. It is again assumed, in this example, that the separable transform to be applied in step C4 is of DST type for its row and column matrices Al and Ac.

A transformed data block $BT^{120}_i$ is obtained on completion of step C4.

In the course of step C5 of FIG. 1, there is undertaken the quantization of the data of the transformed block $BT^{120}_i$.

A block $B^{120}q_i$ of quantized coefficients is then obtained.

In the course of step C6 of FIG. 1, there is undertaken the coding of the data of the block $B^{120}q_i$.

In the course of step C7 of FIG. 1, there is undertaken the construction of the data signal or stream ϕ which contains the coded data on completion of the aforementioned coding step C6.

The coding steps C1 to C7 of FIG. 1 are thereafter implemented for each of the blocks $B_1, B_2, \ldots, B_i, \ldots, B_F$ to be coded of the current image $IC_j$ considered, in a predetermined order which is for example lexicographic order.

Detailed Description of the Decoding Part

An embodiment of the invention will now be described, in which the decoding method according to the invention is used to decode a data signal or stream representative of an image or of a sequence of images which is able to be decoded by a decoder in accordance with any one of the current or forthcoming video decoding standards.

In this embodiment, the decoding method according to the invention is for example implemented in a software or hardware manner by modifications of such a decoder.

Figure 6:
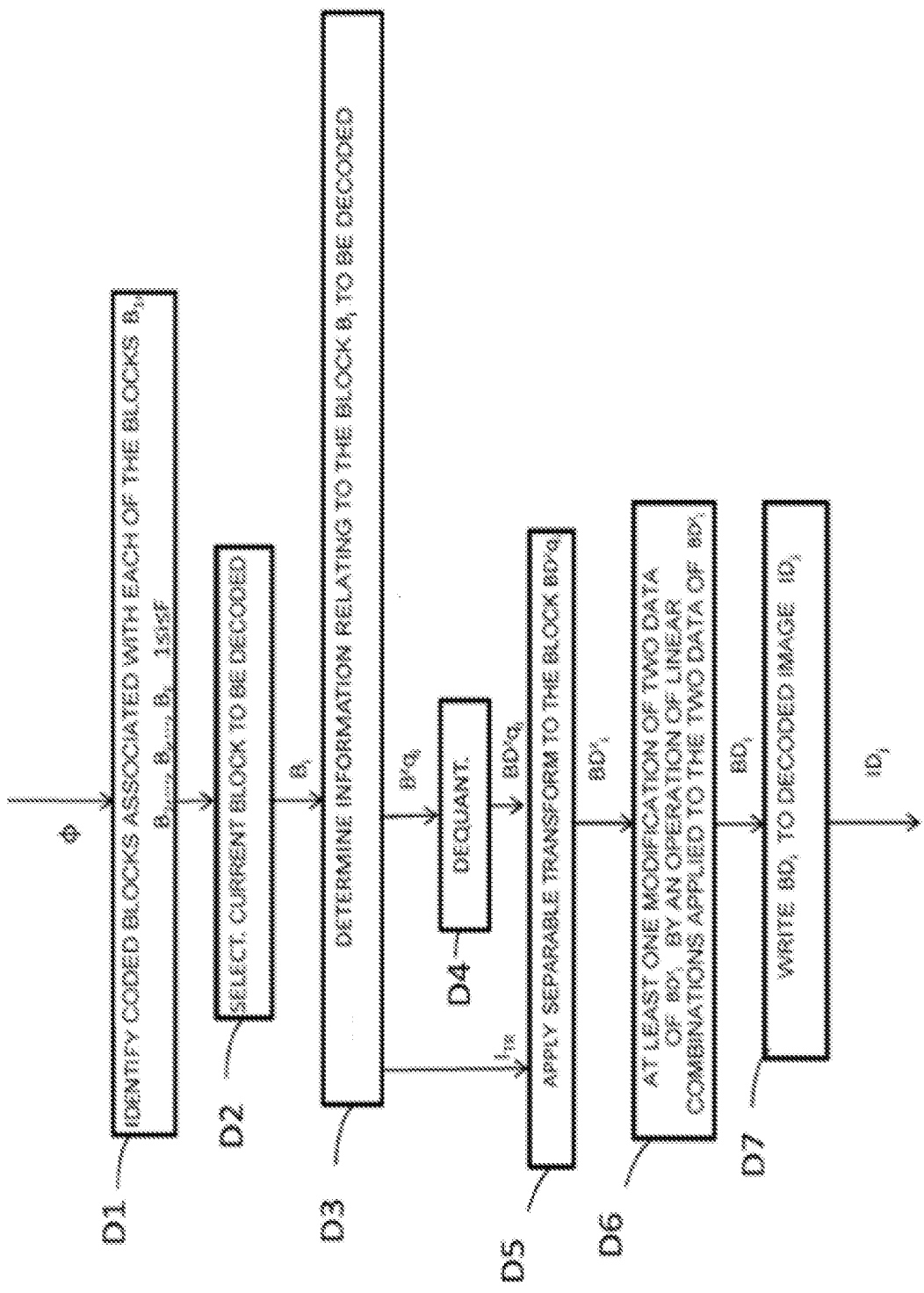
FIG. 6 represents the main steps of the decoding method according to the invention.

The decoding method according to the invention is represented in the form of an algorithm comprising steps D1 to D7 such as are represented in FIG. 6.

Figure 5:
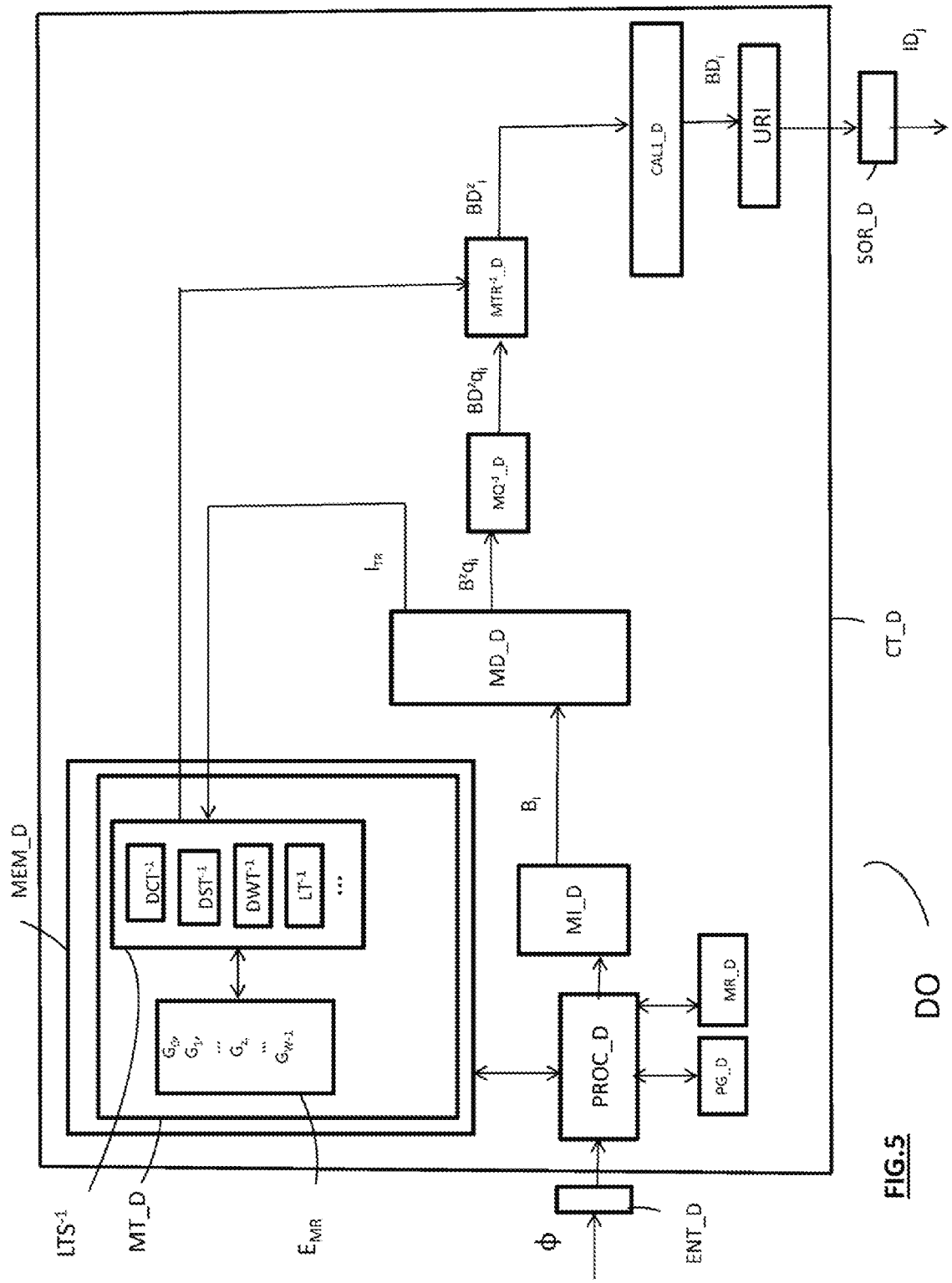
FIG. 5 represents an embodiment of a decoding device according to the invention.

According to this embodiment, the decoding method according to the invention is implemented in a decoding device or decoder DO represented in FIG. 5.

As illustrated in FIG. 5, such a decoder device comprises:
- an input ENT_D for receiving the data signal or current stream ϕ to be decoded,
- a processing circuit CT_D for implementing the decoding method according to the invention, the processing circuit CT_D containing:
  - a memory MEM_D comprising a buffer memory MT_D,
  - a processor PROC_D driven by a computer program PG_D,
- an output SOR_D for delivering a reconstructed current image containing the data obtained on completion of the decoding according to the method of the invention.

On initialization, the code instructions of the computer program PG_D are for example loaded into a RAM memory, MR_D, before being executed by the processing circuit CT_D.

The decoding method represented in FIG. 6 applies to a data signal or stream ϕ representative of a current image $IC_j$ to be decoded which is fixed or which belongs to a sequence of images to be decoded.

For this purpose, information representative of the current image $IC_j$ to be decoded is identified in the data signal ϕ received at the input ENT_D of the decoder DO and such as delivered on completion of the coding method of FIG. 1.

With reference to FIG. 6, in the course of a step D1, there is undertaken, in a manner known per se, the determination in the signal ϕ of the coded blocks associated with each of the blocks $B_1, B_2, \ldots, B_i, \ldots, B_F$ previously coded in accordance with the aforementioned lexicographic order.

Such a determination step D1 is implemented by a stream analysis identification software module MI_D, such as represented in FIG. 5, which module is driven by the processor PROC_D.

Other types of traversal than that mentioned hereinabove are of course possible and depend on the order of traversal chosen on coding.

In the example represented, the blocks $B_1, B_2, \ldots, B_F$ to be decoded have a square shape and are for example of size 4×4 pixels.

In the course of a step D2 represented in FIG. 6, the decoder DO of FIG. 5 selects, as current block $B_i$ to be decoded, the first block which has been coded on completion of the coding method of FIG. 1.

In the course of a step D3 represented in FIG. 6, there is undertaken, in a manner known per se, a determination, for example by decoding, of the data associated with the current block $B_i$ to be decoded which were coded in the course of step C6 of FIG. 1. On completion of such a determination, there is obtained a set of digital information associated with the block of quantized coefficients $B^z q_i$ which was obtained on completion of the quantization step C5 of FIG. 1.

Also in the course of step D3, information can be determined which relates to the type of prediction of the current block $B_i$, if the latter has been predicted on coding, and which information has been written into the data signal ϕ. Such prediction information is in particular the mode of prediction selected on coding and the index of the selected predictor block.

In the course of step D3, is also determined, in a manner known per se, the index $I_{TR}$ of the separable transform applied in step C4 of FIG. 1.

Such a decoding step D3 is implemented by a decoding device MD_D represented in FIG. 5, which device is driven by the processor PROC_D.

In the course of a step D4 represented in FIG. 6, there is undertaken a dequantization of the block of quantized coefficients $B^z q_i$, according to a conventional dequantization operation which is the operation inverse to the quantization implemented during the quantization step C5 of FIG. 1. A current set of dequantized coefficients $BD^z q_i$ is then obtained on completion of step D4. Such a dequantization step is for example of scalar or vector type.

Step D4 is implemented by means of an inverse quantization device $MQ^{-1}\_D$, such as represented in FIG. 5, which device is driven by the processor PROC_D.

In the course of a step D5 represented in FIG. 6, there is undertaken the application of a separable transform to the current set of dequantized coefficients $BD^z q_i$ such as was obtained in the aforementioned step D4. In a manner known per se, such a transform is a transform inverse to that applied on coding on completion of step C4 of FIG. 1, such as for example a DCT, DST, DWT, LT or other transform. In a manner corresponding to the coder CO of FIG. 2, these separable transforms form part of a list of separable transforms $LTS^{-1}$ which is stored beforehand in the buffer memory MT_D of the decoder DO of FIG. 5. The type of separable transform to be applied is determined at the decoder by reading, in the data signal ϕ, the index $I_{TR}$ of the separable transform applied to the coding in the course of the aforementioned step C4 (FIG. 1).

A decoded modified block $BD^z_i$ is obtained on completion of step D5.

Such an operation is performed by a transform calculation device $MTR^{-1}$ D, such as represented in FIG. 5, which device is driven by the processor PROC_D.

In the course of a step D6 represented in FIG. 6, there is undertaken, in accordance with the invention, at least one modification of two data of the decoded modified block $BD^z_i$ by an operation of linear combinations operating on said two data of the decoded modified block $BD^z_i$. The operation of linear combinations comprises the calculation of a first weighted sum and of a second weighted sum each applied to said two data of the decoded modified block $BD^z_i$. A reconstructed block $BD_i$ is obtained on completion of step D6.

Step D6 is implemented by a calculation device CAL1_D represented in FIG. 5, which device is driven by the processor PROC_D.

In the example described here, by data is meant the pixels of the decoded modified block $BD^z_i$.

It should however be noted that by data is also meant the pixels of a residual modified block decoded in the case where a prediction of the current block $B_i$ has been implemented on coding.

According to a first preferential example corresponding to the one represented in FIG. 4A, the two data of the decoded modified block $BD^z_i$, to which the first weighted sum and the second weighted sum are applied, are situated neither in the same row, nor in the same column of the decoded modified block $BD^z_i$.

According to a second example corresponding to the one represented in FIG. 4B, the two data of the decoded modified block $BD^z_i$, to which the first weighted sum and the second weighted sum are applied, are situated in one and the same row of the decoded modified block $BD^z_i$. These two data may or may not be situated alongside one another.

According to a third example corresponding to the one represented in FIG. 4C, the two data of the decoded modified block $BD^z_i$, to which the first weighted sum and the second weighted sum are applied, are situated in one and the same column of the decoded modified block $BD^z_i$. These two data may or may not be situated alongside one another.

In accordance with the invention, the two weighting data used in the first weighted sum are equal in absolute value to the two weighting data used in the second weighted sum.

In a manner corresponding to the coder CO previously described, the calculation of the first and second weighted sums uses a transpose of a rotation matrix $G_z$ belonging to a set $E_{MR}$ comprising W rotation matrices $G_0, G_1, \ldots, G_z, \ldots, G_{W-1}$ where $0 < z < W-1$ previously stored in the buffer memory MT_D of FIG. 5. A rotation matrix $G_z$ considered in this set comprises M rows and N columns, with $M \geq 1$ and $N \geq 1$. Such a transpose is expressed in the following manner:

$$(G_z)^T = \begin{bmatrix} 1 & \ldots & 0 & \ldots & 0 & \ldots & 0 \\ \vdots & \ddots & \vdots & \vdots & \vdots & \vdots & \vdots \\ 0 & \ldots & C & \ldots & -S & \ldots & 0 \\ \vdots & \vdots & \vdots & \ddots & \vdots & \vdots & \vdots \\ 0 & \ldots & S & \ldots & C & \ldots & 0 \\ \vdots & \vdots & \vdots & \vdots & \vdots & \ddots & \vdots \\ 0 & \ldots & 0 & \ldots & 0 & \ldots & 1 \end{bmatrix}^t$$

The transpose of the matrix $G_z$ can also be expressed in the form:

$$(G_z)^T = \begin{bmatrix} 1 & \ldots & 0 & \ldots & 0 & \ldots & 0 \\ \vdots & \ddots & \vdots & & \vdots & & \vdots \\ 0 & \ldots & C & \ldots & S & \ldots & 0 \\ \vdots & & \vdots & \ddots & \vdots & & \vdots \\ 0 & \ldots & S & \ldots & -C & \ldots & 0 \\ \vdots & & \vdots & & \vdots & \ddots & \vdots \\ 0 & \ldots & 0 & \ldots & 0 & \ldots & 1 \end{bmatrix}^t$$

For a decoded modified block considered $BD^z{}_i$, $z+1$ modifications are implemented successively. The calculation of the first and second weighted sums then uses the transpose of each of the rotation matrices $G_0, G_1, \ldots, G_z$ contained in the set $E_{MR}$, such that $(G_0 * G_i * \ldots * G_z)^t$, and applies these transposes in the following order $(G_z)^t, (G_{z-1})^t, \ldots, (G_0)^t$ to the vectorized decoded modified block $BD^z v_i$, so as to obtain a reconstructed block $BD_i$.

In a manner corresponding to the aforementioned coder CO, the predetermined number W of rotation matrices to be used to modify a current decoded modified block $BD^z{}_i$ can depend, according to three possible options:

either on the type of inverse separable transform applied in the previous step D5, or on the mode of prediction selected in the case where the current block $B_i$ has been predicted, or both on the type of inverse separable transform and on the mode of prediction selected.

Also in a manner corresponding to the aforementioned coder CO, in the set $E_{MR}$ of W rotation matrices, each matrix is assigned to particular values of C and S (a particular value of angle θ in the preferred embodiment) and to a pair of indices of data of the vectorized decoded modified block $BD^z v_i$. Certain pairs of values C and S and/or certain pairs of indices of data of the vectorized decoded modified block $BD^z v_i$ can be common to two or more rotation matrices.

In the course of a step D7 represented in FIG. 6, said current reconstructed block $BD_i$ is written to a decoded image $ID_j$.

Such a step is implemented by an image reconstruction device URI such as represented in FIG. 5, said device being driven by the processor PROC_D.

The decoding steps D1 to D7 which have just been described hereinabove are implemented for all the blocks $B_1, B_2, \ldots, B_i, \ldots, B_F$ to be decoded of the current image $IC_j$ considered, in a predetermined order which is for example lexicographic order.

A first exemplary embodiment of the invention in the case of an HEVC decoding of Intra type will now be described hereinbelow.

In this example, the current block $B_i$ to be decoded which is selected in step D2 of FIG. 6 is a 4×4 block. The block $B_i$ to be decoded has moreover formed the subject of a prediction with respect to one of the thirty-five Intra predictions proposed in the HEVC standard, such as for example the direction of prediction $DPI_0$.

In the course of step D3 of FIG. 6, the decoding device MD_D decodes the residual data associated with the current block $B_i$ to be decoded, said residual data representing the difference between the block $B_i$ and the predictor block $BP_{opt}$ selected on coding from among the candidate predictor blocks. A set of digital information associated with a block $B^{35}q_i$ of quantized coefficients is obtained on completion of this decoding.

Also in the course of step D3, information is determined relating to the type of prediction of the current block $B_i$ such as implemented on coding, and which information has been written into the data signal φ.

For this purpose, in the course of step D3, are determined:
the mode of prediction which has been selected on coding, for example the direction of Intra prediction $DPI_0$,
the index of the predictor block $BP_{opt}$, denoted $IBP_{opt}$,
the index $I_{TR}$ of the separable transform applied in the course of step C4 of FIG. 1, said separable transform being, in this example, of DST type.

In the course of step D4 of FIG. 6, the inverse quantization device $MQ^{-1}\_D$ of FIG. 5 undertakes a dequantization of the block of quantized coefficients $B^{35}q_i$. A current set of dequantized coefficients $BD^{35}q_i$ is then obtained on completion of step D4.

In the course of step D5 of FIG. 6, the transform calculation device $MTR^{-1}\_D$ of FIG. 5 undertakes the application, to the current set of dequantized coefficients $BD^{35}q_i$, of the $DST^{-1}$ transform which is the transform inverse to the DST transform associated with the index $I_{TR}$ decoded in step D3 for the columns and the rows. A decoded modified residual block $BD^{35}r_i$ is obtained on completion of step D5.

In accordance with the invention, in the course of step D6 of FIG. 6, there are undertaken thirty-six modifications of two data of the decoded modified residual block $BD^{35}r_i$, each of these modifications amounting to calculating a first weighted sum and a second weighted sum of two corresponding data of the decoded modified residual block $BD^{35}r_i$.

For this purpose, the calculation device CAL1_D searches, in the buffer memory MT_D of the decoder DO of FIG. 5, for the thirty-six rotation matrices $G_0, G_1, \ldots, G_{35}$ of the set $E_{MR}$ which have been previously stored, in the buffer memory MT_D of FIG. 5, in association with the $DST^{-1}$ transform and/or the direction of intra prediction $DPI_0$, and then applies the transpose of each of the thirty-six matrices directly to the decoded modified residual block $BD^{35}r_i$ in the following order $G_{35}{}^t \ldots G_1{}^t G_0{}^t$.

A decoded residual block $BDr_i$ is then obtained on completion of step D6.

In this exemplary embodiment, the rotation matrices $G_0$ to $G_{35}$ are all applied solely to pixels sharing the same row or the same column of the decoded residual block $BDr_i$.

In the course of a step, not represented in FIG. 6, there is conventionally undertaken the predictive decoding of the current block to be decoded with the aid of the index $IBP_{opt}$ of the predictor block which has been decoded in the course of the aforementioned step D3. For this purpose, the predictor block $BP_{opt}$ associated with the index $IBP_{opt}$ is selected from the buffer memory MT_D of the decoder DO of FIG. 5.

In the course of a following step, not represented in FIG. 6, there is undertaken the reconstruction of the current block $B_i$ by adding to the decoded residual block $BDr_i$, obtained on completion of the aforementioned step D6, the predictor block $BP_{opt}$ which was obtained on completion of the previous step.

A current reconstructed block $BD_i$ is then obtained.

In the course of step D7 of FIG. 6, the image reconstruction device URI of FIG. 5 writes the current reconstructed block $BD_i$ to a decoded image $ID_j$.

The decoding steps D1 to D7 of FIG. 6 are implemented for all the blocks $B_1, B_2, \ldots, B_i, \ldots, B_F$ to be decoded of the current image $IC_j$ considered, in a predetermined order which is for example lexicographic order.

In accordance with a second example which will be described hereinbelow, the latter is distinguished from the first example by the fact that the block $B_i$ to be decoded has moreover formed the subject of a prediction with respect to a direction of prediction other than the direction of prediction $DPI_0$. In this second example, this is direction of prediction $DPI_{34}$.

In the course of step D3 of FIG. 6, the decoding device MD_D decodes the residual data associated with the current block $B_i$ to be decoded, said residual data representing the difference between the block $B_i$ and the predictor block $BP_{opt}$ selected on coding from among the candidate predictor blocks. A set of digital information associated with a block $B^{120}q_i$ of quantized coefficients is obtained on completion of this decoding.

Also in the course of step D3, information is determined relating to the type of prediction of the current block $B_i$ such as implemented on coding, and which information has been written into the data signal φ.

For this purpose, in the course of step D3, are determined:
the mode of prediction which has been selected on coding, for example the direction of Intra prediction $DPI_{34}$,
the index of the predictor block $BP_{opt}$, denoted $IBP_{opt}$,
the index $I_{TR}$ of the separable transform applied in the course of step C4 of FIG. 1, said separable transform being, in this example, of DST type.

In the course of step D4 of FIG. 6, the inverse quantization device $MQ^{-1}\_D$ of FIG. 5 undertakes a dequantization of the block of quantized coefficients $B^{120}q_i$. A current set of dequantized coefficients $BD^{120}q_i$ is then obtained on completion of step D4.

In the course of step D5 of FIG. 6, the transform calculation device $MTR^{-1}\_D$ of FIG. 5 undertakes the application, to the current set of dequantized coefficients $BD^{120}q_i$, of the $DST^{-1}$ transform which is the transform inverse to the DST transform associated with the index $I_{TR}$ decoded in step D3 for the columns and the rows. A decoded modified residual block $BD^{120}r_i$ is obtained on completion of step D5.

In accordance with the invention, in the course of step D6 of FIG. 6, there are undertaken a hundred and twenty one modifications of two data of the decoded modified residual block $BD^{120}r_i$, each of these modifications amounting to calculating a first weighted sum and a second weighted sum of two corresponding data of the decoded modified residual block $BD^{120}r_i$.

For this purpose, the calculation device CAL1_D searches, in the buffer memory MT_D of the decoder DO of FIG. 5, for the hundred and twenty one rotation matrices $G_0$, $G_1, \ldots, G_{120}$ of the set $E_{MR}$ which have been previously stored, in the buffer memory MT_D of FIG. 5, in association with the $DST^{-1}$ transform and/or the direction of intra prediction $DPI_{34}$, and then applies the transpose of each of the hundred and twenty one matrices directly to the decoded modified residual block $BD^{120}r_i$ in the following order $G_{120}^t \ldots G_1^t G_0^t$.

A decoded residual block $BDr_i$ is then obtained on completion of step D6.

In this exemplary embodiment:
certain of the rotation matrices of the set $E_{MR}$ are applied to pixels sharing the same row or the same column of the decoded residual block $BDr_i$,
certain other rotation matrices of the set $E_{MR}$ are applied to pixels which share neither the same row, nor the same column of the decoded residual block $BDr_i$.

In the course of a step, not represented in FIG. 6, there is conventionally undertaken the predictive decoding of the current block to be decoded with the aid of the index $IBP_{opt}$ of the predictor block which has been decoded in the course of the aforementioned step D3. For this purpose, the predictor block $BP_{opt}$ associated with the index $IBP_{opt}$ is selected from the buffer memory MT_D of the decoder DO of FIG. 5.

In the course of a following step, not represented in FIG. 6, there is undertaken the reconstruction of the current block $B_i$ by adding to the decoded residual block $BDr_i$, obtained on completion of the aforementioned step D6, the predictor block $BP_{opt}$ which was obtained on completion of the previous step.

A current reconstructed block $BD_i$ is then obtained.

In the course of step D7 of FIG. 6, the image reconstruction device URI of FIG. 5 writes the current reconstructed block $BD_i$ to a decoded image $ID_j$.

The decoding steps D1 to D7 of FIG. 6 are implemented for all the blocks $B_1, B_2, \ldots, B_i, \ldots, B_F$ to be decoded of the current image $IC_j$ considered, in a predetermined order which is for example lexicographic order.

It goes without saying that the embodiments which have been described hereinabove have been given purely by way of wholly non-limiting indication, and that numerous modifications can be easily made by the person skilled in the art without however departing from the scope of the invention.

The invention claimed is:

1. A method of coding at least one image split up into blocks, wherein, for a current block to be coded of said image, the method comprises the following acts performed by a coding device:
making at least one modification to two data of the current block by an operation of linear combinations operating on said two data, on completion of which a modified current block is obtained, said operation of linear combinations comprising calculating a first weighted sum and a second weighted sum, each applied to said two data of the current block,
applying a separable transform operation to data of the modified current block, and
coding data obtained subsequent to applying said separable transform operation.

2. The coding method as claimed in claim 1, wherein two weighting data used in the first weighted sum are equal in absolute value to two weighting data used in the second weighted sum.

3. The coding method as claimed in claim 1, in which the two data of the current block, to which each of the first weighted sum and the second weighted sum are applied, are situated neither in a same row, nor in a same column of said current block.

4. A device for coding at least one image split up into blocks, wherein the device comprises:
a processing circuit which, for a current block to be coded of said image, is designed to:
modify two data of the current block at least once by an operation of linear combinations operating on said two data, on completion of which a modified block is obtained, said operation of linear combinations comprising calculating a first weighted sum and a second weighted sum, each applied to said two data of the current block,
apply a separable transform operation to data of the modified current block,
code data obtained subsequent to applying said separable transform operation.

5. A non-transitory computer-readable recording medium on which is recorded a computer program comprising program code instructions for executing a method of coding at least one image split up into blocks, when said program is executed by a processor of a coding device, wherein the instructions configure the processing coding device to perform acts comprising, for a current block to be coded of said image:
- making at least one modification to two data of the current block by an operation of linear combinations operating on said two data, on completion of which a modified block is obtained, said operation of linear combinations comprising calculating a first weighted sum and a second weighted sum, each applied to said two data of the current block,
- applying a separable transform operation to data of the modified block, and
- coding data obtained subsequent to applying said separable transform operation.

6. A method bar decoding a data signal representative of at least one image split up into blocks, wherein the method comprises the following acts performed by a decoding device for a current block to be decoded:
- determining, in said data signal, a coded-data block associated with the current block to be decoded,
- applying a separable transform operation to the coded data of the current block determined, on completion of which a transformed data block is obtained,
- reconstructing the current block by using at least one modification of two data of said transformed data block, by an operation of linear combinations operating on said two data, said operation of linear combinations comprising calculating a first weighted sum and a second weighted sum, each applied to said two data of the current block.

7. The decoding method as claimed in claim 6, in which two weighting data used in the first weighted sum being equal in absolute value to two weighting data used in the second weighted sum.

8. The decoding method as claimed in claim 6, in which the two data of the transformed data current block, to which each of the first weighted sum and the second weighted sum are applied, are situated neither in a same row, nor in a same column of said transformed data current block.

9. A device for decoding a data signal representative of at least one image split up into blocks, the device comprising:
- a processing circuit which, for a current block to be decoded, is designed to:
- determine, in said data signal, a coded-data block associated with the current block to be decoded,
- apply a separable transform operation to the coded data of the block determined, on completion of which a transformed data current block is obtained,
- reconstruct the current block by using at least one modification of two data of the transformed data block, by an operation of linear combinations operating on said two data, said operation of linear combinations comprising calculating a first weighted sum and a second weighted sum, each applied to said two data of the current block.

10. A non-transitory computer-readable medium on which is recorded a computer program comprising program code instructions for executing a method of decoding a data signal representative of at least one image split up into blocks, when said program is executed by a processor of a decoding device, wherein the instructions configure the processing device to perform acts comprising, for a current block to be decoded:
- determining, in said data signal, a coded-data block associated with the current block to be decoded,
- applying a separable transform operation to the coded data of the block determined, on completion of which a transformed data current block is obtained,
- reconstructing the current block by using at least one modification of two data of said transformed data block, by an operation of linear combinations operating on said two data, said operation of linear combinations comprising calculating a first weighted sum and a second weighted sum, each applied to said two data of the current block.

* * * * *

UNITED STATES PATENT AND TRADEMARK OFFICE
CERTIFICATE OF CORRECTION

PATENT NO. : 10,750,206 B2  
APPLICATION NO. : 15/780032  
DATED : August 18, 2020  
INVENTOR(S) : Adria Arrufat et al.

Page 1 of 1

It is certified that error appears in the above-identified patent and that said Letters Patent is hereby corrected as shown below:

In the Claims

In Claim 6, Column 23, Line 20:
Please delete "bar" and insert --for--.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*